United States Patent [19]
McGahee

[11] 3,754,347
[45] Aug. 28, 1973

[54] FISHING HOOKS, SINKERS, AND LURE APPARATUS

[76] Inventor: Welbourne D. McGahee, 1896 Collidge Ave., Melbourne, Fla. 32935

[22] Filed: Oct. 30, 1972

[21] Appl. No.: 302,217

[52] U.S. Cl. .............................................. 43/44.83
[51] Int. Cl. ............................................ A01k 91/04
[58] Field of Search ..................... 43/44.83, 42.06, 43/43.16, 44.81, 44.86, 44.88–44.89, 44.9, 44.94; 24/73

[56] References Cited
UNITED STATES PATENTS

| | | | |
|---|---|---|---|
| 3,027,676 | 4/1962 | Buttemeier | 43/43.16 |
| 3,241,201 | 3/1966 | Chester | 24/73 |
| 3,494,066 | 2/1970 | Lawter | 43/44.83 |
| 3,604,143 | 9/1971 | Sauers | 43/44.83 |

Primary Examiner—Russell R. Kinsey
Assistant Examiner—Gregory E. McNeill
Attorney—Warren E. Ray

[57] ABSTRACT

A fishhook, a single-ended or double-ended sinker, a line swivel, and a fishing lure, each having one or more beads on the ends of a shank with one or two connectors whereby the bight of a line may be attached or disengaged rapidly without the tieing and untieing of knots. A small wire tool is provided to aid in attaching and disengaging the line from the connector.

13 Claims, 9 Drawing Figures

Patented Aug. 28, 1973  3,754,347

FISHING HOOKS, SINKERS, AND LURE APPARATUS

BRIEF SUMMARY OF THE INVENTION

This invention relates to fishing equipment, and more particularly to hooks, sinkers, swivels, and lures having a quick tie-untie connector for fishing lines. The U.S. Pat. No. 3,604,143 to SAUERS and U.S. Pat. No. 3,654,724 to CHARRON may be of some interest in this field.

The primary object of the invention is the provision of a novel connector combined with fishing apparatus whereby such apparatus may be exchanged quickly without the necessity of tieing or untieing knots in the line.

Another object is the provision of a simple wire hook for attaching and releasing the line from the connector when the fishing apparatus is small in size or when the fisherman does not have nimble fingers.

The invention in the foregoing aspects and in other subsidiary or related aspects will be fully apprehended from the following detailed description of preferred embodiments thereon, taken in conjunction with the appended drawing in which:

BRIEF DESCRIPTION OF THE SEVERAL VIEWS OF THE DRAWING

Similar reference numerals are applied to similar elements throughout the drawing.

DETAILED DESCRIPTION

Figure 1:
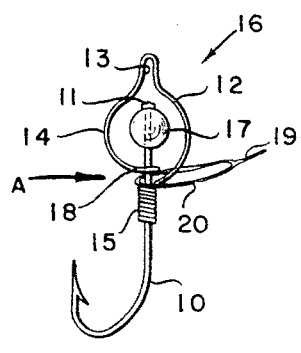
FIG. 1 shows a fishhook and line connector with the line in the initial position for engagement with the connector.
Figure 3:
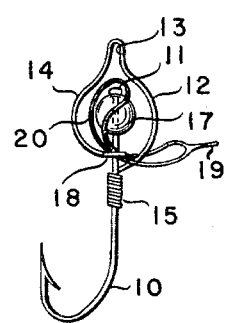
FIG. 3 is similar to FIG. 1 showing the bight of the line passed through the connector eye in position to be passed over the bead.
Figure 4:
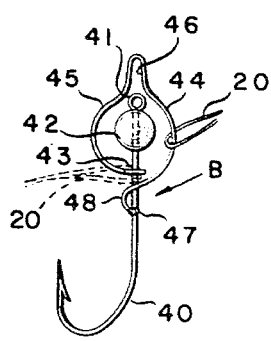
FIG. 4 depicts the line after engagement and in dashed lines the initial position for disengagement as well as a modified connector.

In FIG. 1 the fishhook has a shank 10 provided with a flattened end 11 for retaining a bead 17 which may be generally spherical in shape. The connector, generally indicated by numeral 16, has a spiral portion 15 wrapped around the shank, a right connector loop 12, a left side connector loop 14 ending in an eye 18 encircling the shank 10, and a crimped portion 13 for receiving the bight 20 of a fishing line 19. The spiral 15 is loose on shank 10 permitting the connector to move up and down, but restrained by the bead 17. This feature plus the nature of the connector provides some resiliency between the fishhook and the line. With the fishhook in FIGS. 1, 3–5 the connector also provides swivel action. To engage the fishing line 19 with the connector 16, the bight 20 is placed in the shank area A in FIG. 1, then pulled upward through the eye 18 (with the aid of the hook shown in FIG. 2 if necessary) and over the bead 17 as shown in FIG. 3. A pull on line 19 will place the bight 20 in the position as shown in FIG. 4. In use for fishing the line bight 20 will rest in the crimp 13.

Figure 2:
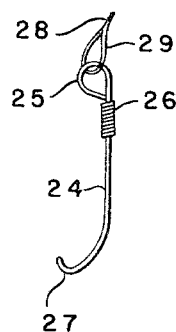
FIG. 2 illustrates a wire hook useful in manipulating the line.

The wire hook in FIG. 2 is provided as an aid in connecting and disconnecting the line bight 20 with the connector 16. This device includes a hook 27 on shank 24 having a loop 25 with the wire spiraled at 26 around the shank 24. A short line 28 with a loop 29 through the wire loop 25 is provided so that the fisherman may attach the tool to a button or belt so as to keep it handy. It will be understood that fisherman with nimble fingers or when large fishing apparatus are involved the tool may not be necessary.

Figure 5:
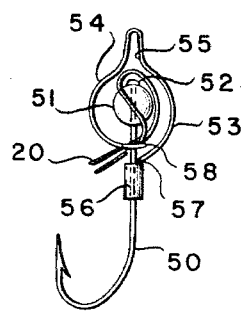
FIG. 5 shows a further modified connector and the second step in removing the line.

In removing the hook from the line, the line bight 20 is placed in the shank area B in the position shown in dashed lines in FIG. 4, then the bight 20 is pulled through the eye 18 (or 43, FIG. 4, 58 in FIG. 5) and up over the bead as shown in FIG. 5. A pull on the line will then disengage the line from the hook. The procedure in ataching and removing the line bight is the same for all embodiments.

The modification shown in FIG. 4 has a fishhook shank 40 with an eye 41 above and retaining the spherical-like bead 42. The connector has an eye 43 encircling the shank 40, a left side loop 45, a crimp 46, a right side loop 44 having, say, a half bend around shank 40 braised or welded to shank 40 at 47.

In FIG. 5 a further slight modification is shown wherein fishhook shank 50 has a spherical-like bead 51 retained on the shank 50 with a flattened end 52 of the shank similar to that shown in FIGS. 1 and 3. The connector includes an eye 58, a left loop 54, a crimped portion 55, a right loop 53 with the latter affixed with a braise or weld 57 to a movable cylindrical sleeve 56 encircling the shank 50.

Figure 6:
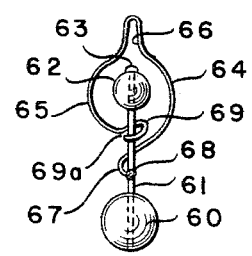
FIG. 6 is a showing of a single-ended sinker with connector.

FIG. 6 shows a single-ended sinker with sinker weight 60 on the lower end of shank 61 having a spherical-like bead 62 on the other end of the shank restrained by a flatteneed portion 63. The connector has an eye 69 with a gap 69a encircling the shank 61, a left loop 65, a crimp 66, a right loop 64 ending in a half bend braised or welded to the shank at 68. The line bight is connected or disconnected as heretofore described.

Figure 7:
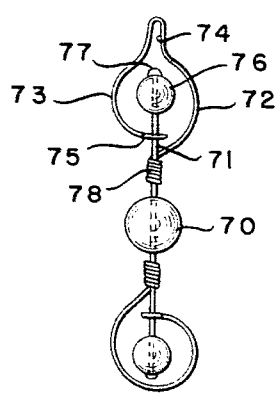
FIG. 7 illustrates a double-ended sinker.

FIG. 7 discloses a double-ended sinker arrangement wherein the lower connector is identical to the upper connector with the numerals omitted from the lower connector. A sinker weight 70 is affixed in any suitable manner to a shank 71 having a spherical-like bead 76 at each end thereof retained by a shank flattened portion 77. The connector at each end of the sinker arrangement includes an eye 75 encircling the shank 71, a left loop 73, a crimp 74, a right loop 72 ending with a spiraled portion 78 encircling the shank 71. In this case the fishing line would comprise two bights (not necessarily two portions of a fishing line) which are engaged and disengaged as heretofore described. The advantages of having a sinker weight in the line of travel of the cast instead of being offset causing the line, hook, and bait to travel in a spiral motion decreasing distance and possible loss of bait is an important advantage of the invention. It should also be noted that the connectors in FIG. 7 provide a swivel arrangement.

Figure 8:
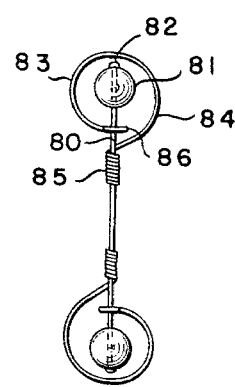
FIG. 8 depicts a double-ended line swivel.

Turning now to FIG. 8 a double-ended line swivel includes a shank 80 having a spiral-like bead 81 at each end of the shank 80 retained by a shank flattened portion 82. The identical connectors at each end comprise an eye 86 encircling the shank 80, a left loop 83, a right loop 84, and a spiral 85 around the shank 80. It will be understood that a crimp may be provided as shown in FIG. 1 and FIGS. 3–7. The method of connecting and disconnecting the bights in the fishing line is identical to that heretofore disclosed. It will be apparent that in addition to the quick connect-disconnect feature the swivel provides some resiliency between the fishing rod and the fishing implement.

Figure 9:
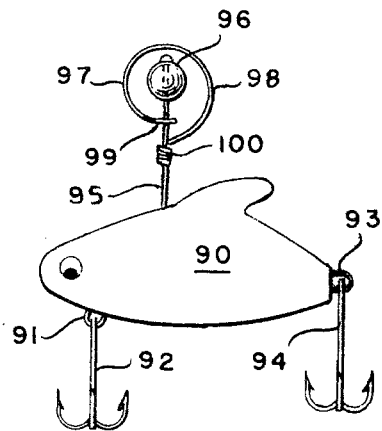
FIG. 9 shows a fishing lure with connector.

The connector may be adapted to cooperate with a fishing lure 90 as depicted in FIG. 9 with typical three hooks 92, 94 having an attaching eyes 91, 93. A shank 95 is embedded into the lure 90 at a predetermined place having a spherical-like bead 96 retained thereon with the usual flattened end of the shank 95. However, it should be noted that in FIG. 9 and other figures that the bead may be retained on the shank by fixing the bead to the shank with any means other than flattening the end of the shank. The connector includes an eye 99, a left loop 97, a right loop 98 ending in a spiral loop 100 encircling the shank 95. As with other figures a crimp may be provided in the connector to insure that the line remains in a satisfactory position. Also the method of connecting and disconnecting the line bight is the same as heretofore described.

In summary this invention provides a novel connector combined with a fishhook, sinker, line swivel, and a lure whereby a fishing line bight may be rapidly connected or disconnected to change to size or weight of hooks, sinkers, or lures without the necessity of tieing or untieing knots in the line. The connector also provides a certain amount of resiliency or "give" between the line and fishing implements as well as providing swivel action except in FIGS. 4 and 6. A simple wire tool is provided for aiding in the line connection-disconnection when the fishing implement is small or the fingers of the fisherman are large requiring a tool.

It will be apparent that the embodiments shown are only exemplary and that various modifications can be made in construction and arrangement within the scope of my invention as defined in the appended claims.

I claim:

1. A fishing apparatus comprising a shank member, a fishing implement means on the lower part of said shank member, a connector means at the upper end of said shank member including an eye member encircling said shank member, a left loop portion connected to said eye member, a right loop portion connected to said left loop portion, means connecting said right loop portion to said shank member, and means on said shank member above said eye member retaining said connector means on said shank member.

2. A fishing apparatus according to claim 1 wherein said connector means includes a crimped portion between said left loop portion and said right loop portion.

3. A fishing apparatus according to claim 1 wherein said means connecting said right loop portion to said shank member includes a spiraled portion encircling said shank member.

4. A fishing apparatus according to claim 1 wherein said means connecting said right loop portion to said shank member includes a weld.

5. A fishing apparatus according to claim 1 wherein said means connecting said right loop portion to said shank member includes a sleeve member movable on and encircling said shank member.

6. A fishing apparatus according to claim 1 wherein said eye member encircling said shank member is provided with a small gap between the end of said eye member and said left loop portion.

7. A fishing apparatus according to claim 1 wherein said fishing implement means on the lower part of said shank member is a fishhook.

8. A fishing apparatus according to claim 1 wherein said fishing implement means on the lower part of said shank member is a fish lure having fishhooks.

9. A fishing apparatus according to claim 1 wherein said fishing implement means on the lower part of said shank member is a sinker weight.

10. A fishing apparatus according to claim 1 wherein said fishing implement means on the lower part of said shank member comprises a sinker weight and a second connector means having an eye member encircling said shank member, a left loop portion connected to said eye member, a right loop portion connected to said left loop portion, and means connecting said right loop portion to said shank member.

11. A fishing apparatus according to claim 1 wherein said fishing implement means on the lower part of said shank member includes a second connector means having an eye member encircling said shank member, a left loop portion connected to said eye member, a right loop portion connected to said left loop portion, and means connecting said right loop portion to said shank member whereby said apparatus functions as a fishing line swivel.

12. A fishing apparatus according to claim 1 wherein said means on said shank member above said eye member retaining said connector means on said shank member includes a bead retained on said shank member by a flattened portion of said shank member.

13. A fishing apparatus according to claim 1 wherein said means on said shank member above said eye member retaining said connector means on said shank member includes a bead retained on said shank member by an eye on the upper end of said shank member.

* * * * *